United States Patent [19]
Sekiguchi et al.

[11] 3,886,251
[45] May 27, 1975

[54] METHOD FOR FORMING POLYOXADIAZOLE SERIES RESIN SOLUTION INTO SHAPED ARTICLES

[75] Inventors: Hideo Sekiguchi; Kazuo Sadamitsu, both of Yokohama, Japan

[73] Assignee: The Furukawa Electric Co., Ltd., Tokyo, Japan

[22] Filed: Sept. 4, 1973

[21] Appl. No.: 393,978

Related U.S. Application Data

[63] Continuation of Ser. No. 313,797, Dec. 11, 1972, which is a continuation-in-part of Ser. No. 717,961, April 1, 1968, abandoned.

[30] Foreign Application Priority Data

| | | |
|---|---|---|
| Apr. 11, 1967 | Japan | 42-22981 |
| Apr. 11, 1967 | Japan | 42-22984 |
| Apr. 15, 1967 | Japan | 42-2398 |
| Apr. 15, 1967 | Japan | 42-23982 |

[52] U.S. Cl. .......................... 264/184; 264/210 F
[51] Int. Cl.$^2$ ........................................ D01D 5/06
[58] Field of Search ........ 260/78 R, 30.8 R, 78.4 R; 264/184, 210 F

[56] References Cited
UNITED STATES PATENTS

| | | | |
|---|---|---|---|
| 3,238,183 | 3/1966 | Frazer | 260/78.4 R |
| 3,269,970 | 8/1966 | Epstein et al. | 260/30.8 R |
| 3,316,213 | 4/1967 | Berr | 260/78.4 R |
| 3,414,645 | 12/1968 | Morgan | 264/203 |
| 3,567,698 | 3/1971 | Kovacs et al. | 260/30.8 R |
| 3,671,542 | 6/1972 | Kwolek | 264/184 |
| 3,734,893 | 5/1973 | Studinka et al. | 260/30.8 R |
| 3,775,382 | 11/1973 | Brydon | 260/30.8 R |

OTHER PUBLICATIONS

"Poly-1,3,4-oxadiazoles," Pt. I, Iwakura et al., J. of Polymer Sci., pf. A. Vol. 3, pp. 45–34, (1965).

*Primary Examiner*—Jay H. Woo
*Attorney, Agent, or Firm*—Stevens, Davis, Miller & Mosher

[57] ABSTRACT

Shaped articles can be produced by subjecting a solution of polyoxadiazole series resin alone or in mixture with at least one inorganic salt in a concentrated sulfuric acid to be coagulated to wet process by using an aqueous solution of sulfuric acid, a lower aliphatic carboxylic acid, a mixture of these acids or a mixture of said acid or said mixture with at least one of inorganic acids and amide compounds as a coagulant and washing the wet-shaped articles obtained by this coagulation with water and then contacting with buffer solution, amine, amide compound or some salt of weak acid or some metal hydroxide.

17 Claims, No Drawings

METHOD FOR FORMING POLYOXADIAZOLE SERIES RESIN SOLUTION INTO SHAPED ARTICLES

This is a continuation of application Ser. No. 313,797, filed 12-11-72 (which is a continuation-in-part of Ser. No. 717,961, now abandoned).

The present invention relates to a method for forming a solution of polyoxadiazole series resin formable by wet process into shaped articles.

Recently, polyoxadiazole resin has been developed as a resin having a high heat resistance but said resin has neither melting point nor softening point and is not soluble in organic solvents, so that it is not usable.

Heretofore, as a method for utilizing such a resin having a high heat resistance but the above-described drawbacks, a process has been proposed in which a high molecular weight intermediate product soluble in an organic solvent is firstly formed in the production and during or after the forming, said intermediate product is subjected to a cyclodehydration by a chemical or thermal treatment, whereby said intermediate product is converted into a resin having a higher heat resistance. However, this process cannot be applied to such resins because when they are formed into a high molecular weight intermediate product, said product has a low solubility in an organic solvent or is difficult of said cyclodehydration, and further this process has a defect that the condensation product at cyclodehydration causes foaming, so that such a process has not been put to commercial use. Conventional polyoxadiazoles, for example, disclosed in U.S. Pat. No. 3,238,183 and J. Polymer Sci., A2 1157 (1964), have such defects, so that such polyoxadiazoles cannot be used in practice.

Polyoxadiazole resin is soluble in concentrated sulfuric acid, but a process, in which such a solution is formed into shaped articles, has never been proposed. Furthermore, even as a method for coagulating the resin from the resin solution, only an experimental method of reprecipitation, in which a solution of the resin in fuming sulfuric acid obtained by the synthetic reaction is poured into a large amount of ice water to reprecipitate said resin, has been known as described in J. Polymer Sci., A3 45 (1965). However, if this method is utilized for a coagulating means in forming process, the product is whitened and a uniform coagulation cannot be effected, so that shaped articles having a high mechanical strength cannot be obtained and therefore this method has not been applicable to the coagulating means in forming.

An object of the present invention is to provide a novel method for forming into shaped articles at a low cost, such as, fibers, films, impregnated materials and the like composed of polyoxadiazole series resin having excellent heat resistance, mechanical property, electric property, chemical stability, etc.

The inventors have been interested in the excellent thermal and chemical stability, solubility in concentrated sulfuric acid and low cost of polyoxadiazole series resin and have made many studies on methods for forming polyoxadiazole series resin easily by wet process into shaped articles, such as, fibers, films, impregnated materials and found that a solution made by dissolving 2 to 15% by weight of a polyoxadiazole series resin selected from the group consisting of 1. polyoxadiazole consisting of the following structural unit

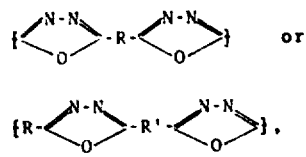

wherein R and R' are the same or different bivalent radicals selected from the group consisting of aromatic ring with or without heterocycles and, if necessary, $-CH_2-$, $-O-$, $-S-$, $-CO-$, $-SO_2-$, the molecular weight of said resin corresponding to an inherent viscosity of more than 0.4 in 0.5% resin solution in 95% by weight of sulfuric acid at 30°C., and 2. oxadiazole-N-substituted hydrazide copolymeric resin consisting of the following structural unit

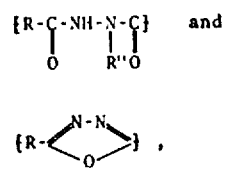

wherein R is bivalent radical selected from the group consisting of aromatic ring with or without heterocycles and, if necessary, $-CH_2-$, $-O-$, $-S-$, $-CO-$, $-SO_2-$, and R'' is alkyl, cycloalkyl or aralkyl group having 1 to 7 carbon atoms, the molecular weight of said resin corresponding to an inherent viscosity of more than 0.04 in 0.5% by weight resin solution in 95% by weight of sulfuric acid at 30°C, with or without one or more inorganic salts and/or amide compounds of less than saturated concentration, in concentrated sulfuric acid or fuming sulfuric acid (abridged as concentrated sulfuric acid hereinafter) having a sulfuric acid concentration of 78 to 110% by weight, is introduced through an opening of predetermined cross-section into any one of coagulating baths having the following composition, whereby coagulation is effected without deteriorating various properties, for example, heat resistance, mechanical properties, etc., of the resin.

The composition of the coagulating bath is any of the following:

1. 15 to 68% by weight aqueous solution of sulfuric acid.
2. 60 to 100% by weight aqueous solution of one or more lower aliphatic carboxylic acids having pka (25°C) of less than 3.8.
3. mixed aqueous solution of sulfuric acid and at least one of the above carboxylic acids in which the quantity of sulfuric acid is 15 to 68% by weight or in which the quantity of said carboxylic acids is more than 60% by weight.
4. mixed solution of any one of the above described coagulating baths (1) to (3) and at least one inorganic salt of less than saturated concentration.
5. mixed solution of any one of the above described coagulating baths (1) to (4) and amide compounds.

Thus, the inventors have found that shaped articles, for example, fiber, films, and impregnated materials composed of polyoxadiazole series resin can be easily formed by introducing the above described resin solutions into the above described coagulating baths by means of shaping means applicable to conventional wet forming to effect coagulation.

However, it has been found that although the shaped articles obtained in the above described process or the products obtained by subjecting said shaped articles to drawing treatment or heat treatment have various excellent properties, if the shaped articles thus obtained are kept at a relatively low temperature at which they are often used, for example, 150° – 200°C for a long time, these properties are degraded. It is a serious problem in the practical use of polyoxadiazole series resin shaped articles that the resulting shaped articles have a low heat stability at such temperature.

The inventors have presumed that the cause of such phenomenon is not based on the inherent property of the resin but based on the fact that since the processing of said resin is a wet process wherein a strong acid, such as sulfuric acid is used, such a strong acid sticks and remains on the resulting shaped articles and the remaining acid increases the deterioration of the resin at such a relatively low temperature. Therefore, the inventors have thought that this problem may be solved by thoroughly washing with water the shaped articles in gelled state formed in the coagulation step and carried out such a treatment but any particularly improved results have never been obtained. From this result, it has been found that the above described presumption is not correct and the inventors have studied diligently why such phenomenon occurs and found that the polyoxadiazole series resins to be used in the present invention are different from polyamide, polyacrylonitrile, polybenzimidazole and the like which have been previously used in the wet process in which sulfuric acid is used and the oxadiazole ring contained in said resin is basic and therefore sulfuric acid used as the solvent reacts with the base, oxadiazole ring, to form a stable complex and consequently the acid cannot be completely removed by a mere washing treatment with water and remains in the shaped articles even after the washing treatment.

Based on such a discovery, the inventors have judged that the thermal deterioration of the polyoxadiazole shaped articles formed by the above-described wet process is due to the remaining strong acid and thought that the positive removal of such remaining acid is effective in solving the above-described investigations with respect to the process therefor.

As the results, it has been found that a solution dissolving polyoxadiazole series resin in 75 – 110% by weight of sulfuric acid in a concentration of 2 – 15% by weight is formed into desired shapes by coagulation, introduced into the coagulating bath selected from the above described coagulating baths (1), (2), (3), (4) and (5) and then washed with water to obtain shaped articles in gelled state, after which the resulting articles are brought into contact with an aqueous solution containing at least one of the group consisting of 1. buffer solution indicating pH 5 to pH 12,
2. amide compound soluble in water,
3. amine,
4. hydroxide, carbonate, bicarbonate, silicate and phosphate of sodium, potassium, lithium, magnesium and zinc, and then washed with water whereby shaped articles having an improved stability for a long period of time even at a relatively low temperature can be obtained without degradation of other properties. Furthermore, it has been found that additional effects which vary depending upon the treating agents, can be attained by such a treatment; for example, the electric properties and light resistance may be improved by the use of amines or amides and the stability may be further improved by the metal salts which substitute for injurious ions.

Polyoxadiazole to be used in the present invention can be produced by the following known processes, namely A. J. Polymer Sci., A3 45 (1965) discloses that said polyoxiadiazole is produced by reacting aromatic dibasic acid or the derivatives thereof with hydrazine or a salt thereof in fuming sulfuric acid or polyphosphoric acid.

B. U.S. Pat. No. 3,238,183, J. Polymer Sci., A2 1157 (1964) discloses that an aromatic dibasic acid halide is reacted with hydrazine or aromatic dibasic acid dihydrazide in the presence of acid acceptor to produce polyhydrazide, which is converted into oxadiazole by heating.

C. Makromol. Chem., 44-6 388 (1961) discloses that bistetrazole derived from aromatic dibasic acid is reacted with aromatic dibasic acid halide in the presence of acid acceptor to produce polyoxadiazole.

It is preferable that polyoxadiazole to be used in the present invention is produced by the above described known process (A).

The above described aromatic dibasic acid used to produce polyoxadiazole series resins includes, for example, terephthalic acid, isophthalic acid, 4,4'-dicarboxydiphenyl, 4,4'-dicarboxydiphenyl ether, 3,4'-dicarboxydiphenyl ether, 4,4'-dicarboxydiphenyl sulfide, 4,4'-dicarboxydiphenylsulfone, etc. The derivatives of these dibasic acids include alkyl ester of these dibasic acids, alkyl of which has 2 to 4 carbon atoms, for example, diethyl terephthalate, diisopropyl terephthalate, dibutyl terephthalate, diethyl isophthalate; amide of these dibasic acids, such as terephthalamide, isophthalamide, etc.; dihydrazide of these dibasic acids, such as terephthal dihydrazide, isophthal dihydrazide, etc. and nitrile of these dibasic acids, such as, terephthalonitrile, isophthalonitrile, etc. Furthermore, the aromatic dibasic acids include those containing heterocyclic ring, for example, benzimidazole, benzoxazole, benthiazole, triazole, thiadiazole, imidazopyrrolone, cyclic imide, thaizole, oxazole. The latter compounds include 2,2'-bis(m-carboxyphenyl)-5,5'-dibenzimidazole, 2,2'-bis(m-carboxyphenyl)-5,5'-bisbenzoxazole, 2,5-bis(p-carboxyphenyl)-1,3,4-thiadiazole, 6,6'-bis(m-carboxy)isoindro[1,2-a] quinazoline dione, and 2-(p-carboxyphenyl)-5(6)-carboxybenzimidazole. Among the polyoxadiazole series resins, preferable resins having a m-phenylene radical.

The resin containing N-substituted hydrazide structural unit to be used in the present invention can be easily obtained by reacting a polyoxadiazole produced in the above described processes with an alkyl, cycloalkyl or aralkyl sulfate, preferably methyl, ethyl, isopropyl, or tertiary butyl sulfate and in this case, an amount of N-substituted hydrazide structural units introduced can be varied by the ratio of said sulfuric acid esters to oxadiazole structural units, so that copolymer having N-substituted hydrazide structural units and oxadiazole structural units can be easily produced.

However, it is preferable in view of the heat resistance that the amount of N-substituted hydrazide structural unit in the copolymer is less than the amount of oxadiazole structural unit and the oxadiazole structural unit constitutes preferably 50 to 95 mol% and the N-substituted hydrazide structural unit, 50 to 5 mol% of the copolymer.

The inherent viscosity of polyoxadiazole series resin to be used in the present method is shown by the following formula:

$$\eta \text{ inh.} = \ln \eta \text{rel.}/c$$
$\eta$ inh. = inherent viscosity
$\eta$ rel. = relative viscosity
$c$ = concentration of resin ($\approx 0.5\%$) 30°C, in 95% by weight of sulfuric acid The reason why the inherent viscosity corresponding to molecular weight of polyoxadiazole series resin to be used in the invention is limited is based on the following fact:

Even though the inherent viscosity is less than the lower limit, shaped articles can be obtained by the present process, but in this case, if the molecular weight of said resin is too low, the mechanical strength, thermal and chemical stabilities are poor and the resulting shaped articles cannot be used commercially.

Furthermore, the reason why the concentration of sulfuric acid to dissolve said resin is limited to 78 to 110% by weight, is based on the following fact.

At a concentration of less than 78% by weight, the solubility is too low to form a homogeneous solution of the resin. As far as the concentration is more than 78% by weight, fuming sulfuric acid, the concentration of which is more than 100%, can be used. However, when the concentration of sulfuric acid is lower within the above described range, there is an advantage that the viscosity of the resin solution is low and in a concentration of less than 100%, there is a further advantage that no fume generates, when the resin solution comes in contact with moisture.

On the other hand, the higher concentration of sulfuric acid is advantageous in view of hydrolytic stability of resin in the solution and protection of forming apparatus from corrosion due to the resin solution. With a concentration of more than 110% by weight, sulfuric acid is solid at room temperature, so that the handling is very difficult and such sulfuric acid cannot be used as a solvent. Accordingly, preferable range of the concentration of sulfuric acid in the present process is 90 to 106% by weight, most preferably, about 100% by weight.

The concentration of the resin in the resin solution is closely related with the viscosity of the solution. The viscosity of the solution is important in wet forming. The reason why the concentration of the resin in the resin solution is limited as described above, is based on such a point of view. At a concentration of less than 2% by weight, even though the present process can be applicable to such a solution, the viscosity of the solution is too low and a large amount of concentration sulfuric acid is necessary as the solvent, so that such a concentration is not preferable in view of the difficulty of forming and the economy. On the other hand, at a concentration of more than 15% by weight, the viscosity of the resin solution is very high and therefore, the handling of said solution is very difficult in forming process. Accordingly, the preferable range is 2 to 15% by weight.

According to the present process, desired shaped articles in gelled state can be manufactured by extruding the above-described resin solution through proper shaping means, for example, orifices having a desired cross section, such as, circular hole, rectangular slit, wave-like slit and then introducing the thus extruded material into any one of the coagulating baths having the above-described compositions or impregnating glass cloths or inorganic porous materials inert to the resin solution, for example, asbestos or rock wool articles with said resin solution and dipping the impregnated glass cloths or inorganic porous materials in said coagulating bath, whereby the desired shaped articles in gelled state are obtained.

The reason why the concentration of sulfuric acid in the above described coagulating bath (1) is limited to 15 to 68% by weight, is based on the following fact.

Sulfuric acid, which is a solvent for the resin, is very hydrophilic, so that if the concentration of sulfuric acid in the coagulating bath is less than 15%, the surface of the resin solution introduced into the coagulating bath, coagulates rapidly and the coagulated layer retards penetration of the coagulant into its interior, so that the interior firstly is gelled and then the coagulation proceeds gradually and as the result, the interior becomes porous and nonuniform and opaque shaped articles are formed. The resulting shaped articles are unsatisfactory in physical properties and are not suitable for practical use. On the other hand, sulfuric acid having a concentration of more than 68% causes no coagulation at all or only poor coagulation where it is very long before the resin solution coagulates and becomes strong enough to make continuous production possible. Therefore, such a concentration is disadvantageous in view of forming velocity and forming facilities and is not practicable.

Furthermore, in order to produce filaments and films having excellent transparency and drawability particularly, it is preferable to use 35 to 60% by weight aqueous solution of sulfuric acid.

The reason why in the above-described coagulating bath (2), said coagulating bath is limited to 60 to 100% by weight aqueous solution of the lower aliphatic carboxylic acids having pKa (25°C) of less than 3.8, is based on the following fact:

The carboxylic acids having pKa (25°C) of more than 3.8 cannot effect uniform coagulation and further less than 60% by weight aqueous solution of carboxylic acid does not provide uniform coagulated layer for the same reason as in the case of aqueous solution of less than 15% by weight of sulfuric acid.

As the carboxylic acids having pKa (25°C) of less than 3.8, mention may be made of, for example, formic acid, mono- and poly-haloacetic acid (mono- and polyfluoro-, chloro, bromoacetic acid, etc.), halopropionic acids, etc.

In the above described coagulating bath (3), it is necessary to use 15 to 68% by weight of sulfuric acid or more than 60% by weight of the above-described aliphatic carboxylic acids, but if the concentrations of these coagulants are within these ranges, any mixing ratio is usable.

The mixed solution beyond these ranges cannot be used for the same reason as described in the explanation of the coagulating baths (1) and (2).

The above-described coagulating bath (4) is the one made by adding at least one inorganic salt of less than saturated concentration to any one of the above-described coagulating baths (1) to (3) and can provide more excellent shaped articles. Of course, the inorganic salt to be used can be added in an amount exceeding the saturated concentration, but the use of the excess amount does not bring about any effect to the present process, so that it is insignificant.

As the inorganic salts, use may be made of, for example, sulfates, phosphates, chlorides, nitrates and the like, of ammonium, aluminum, sodium, zinc, magnesium, nickel, iron, copper, potassium, manganese, ferro-ammonium, etc. By addition of these salts, the coagulation velocity can be adjusted, that is, the coagulation velocity can be lowered, for example, by sodium, magnesium, zinc and aluminum salts and accelerated by ammonium, nickel, potassium, iron, copper salts, so that the hydrolytic stability, transparency, drawability and tenacity of the shaped articles can be also adjusted. However, when sulfuric acid is present in the coagulating bath, the sulfates are preferable.

These inorganic salts, when added to the resin solution, have substantially the same effects on the coagulation as when added to the coagulating bath. Especially in this case the coagulation can proceed at lower temperature.

Among the above-described coagulating baths (1) to (4), an aqueous sulfuric acid solution alone or an aqueous solution added with the inorganic salts added thereto is most preferable.

The above-described coagulating bath (5) is the one made by adding with at least one amide compound to any one of the above-described coagulating baths (1) to (4) and can provide excellent shaped articles, because this bath can prevent hydrolysing of the resin in the coagulating process. The amide compound to be used in this invention is selected from the group consisting of formamide, N-methyl(or ethyl, propyl, butyl)formamide, N,N-dimethyl(or diethyl, dipropyl, dibutyl) formamide, acetamide, N,N-dimethyl(or diethyl)acetamide, diacetamide, triacetamide, methylenediacetamide, propionamide, oxalic amide, N-methyl pyrrolidone and salts of these amides with mineral acids, such as sulfuric acid, hydrochloric acid, nitric acid, phosphoric acid. The particularly preferable amide compounds among this group are formamide, N,N-dimethyl or diethyl formamide, acetamide, N,N-dimethyl or diethyl acetamide, N-methyl pyrrolidone in the view of preventing the resin from hydrolysis in the coagulating process.

According to the present invention, the temperature in the coagulating bath has no definite range and is freely selected to adjust the coagulation velocity according to the kind of shaped articles to be produced, but when the other conditions are same, the higher temperature of the coagulating bath is preferable. However, the preferable temperature range of the coagulating bath is 0° – 80°C in view of material of the coagulating bath tank, chemical change of shaped articles in the coagulating bath and vapor pressure of the coagulants.

According to the present invention, the aqueous solution of the substance selected from the following groups is used as a treating agent for contacting with the shaped article, after being coagulated and washed with water, in order to improve the properties of the shaped article.

1. buffer solutions having a buffer action within a pH range of 5.0 to 12.0. Among them, the use of Clark-Lubs' buffer solution, Sørensen's buffer solution, Atkins-Pantin's buffer solution, Menzel's buffer solution and Gomori's buffer solution is preferable.
2. water-soluble acid amides, for example, formamide, N-methyl(or ethyl, propyl, butyl)formamide, N,N-dimethyl(or diethyl, dipropyl, dibutyl) formamide, acetamide, N,N-dimethyl(or diethyl) acetamide, diacetamide, triacetamide, methylenediacetamide, propionamide, oxalic amide, N-methyl pyrrolidone, etc. Among them, the use of formamide, N,N-dimethyl formamide, N,N-diethyl formamide, N,N-dimethyl acetamide, acetamide and N-methyl pyrrolidone is preferable in view of their affinity for the shaped article and the high solubility in water.
3. amines, for example, butylamine, propylamine, diethylamine, triethylamine, ethylenediamine, trimethylenediamine, nonamethylenediamine, piperazine, hexamethylenetetramine, ethanolamine, diethanolamine, triethanolamine, morpholine, N-methylmorpholine, p-aminophenol, aniline, ethylaniline, dimethylaniline, toluidine, pyridine, o-phenylenediamine, α-naphthylamine, etc. Particularly, in view of auxiliary effects, for example, a high penetration into the shaped article and a high solubility of the resulting sulfuric acid salt in water, monoethanolamine, diethanolamine, triethanolamine, aniline, triethylamine, pyridine and p-aminophenol and preferable.
4. hydroxides, carbonates, dicarbonates, silicates, acetates and phosphates of sodium, potassium, lithium, magnesium, zinc, copper and manganese. In view of the auxiliary effect, the use of sodium hydroxide, lithium hydroxide, sodium carbonate, potassium carbonate, sodium bicarbonate and sodium silicate is preferable.

The treating agents are limited as described above for the following reasons. It should be expected that if only the neutralization of the remaining acid is aimed at, any one of basic substances can attain the same effect as mentioned above, but as a matter of fact, it has been confirmed that basic substances other than the above defined substances degrade various properties of the shaped articles and bring about negative effects. The reason why the properties of shaped articles obtained only by coagulation and washing are deteriorated at a comparatively low temperature over a long period of time is not clear but it is presumed to be not due only to the remaining acid in the shaped article.

In order to make the shaped article in gelled state, formed by wet process, contact with aqueous solution of the above-mentioned substance for said treatment, there are some procedures, including the one in which the shaped article is passed through or dipped into the aqueous solution of the substance, and also the one in which the aqueous solution of the substance is sprayed on the shaped article. The present invention is not intended to limit to these procedures.

The concentration of the substance in the aqueous solution for said treatment is not critical, but it is usually less than 10%, preferably less than 5% because at the higher concentration the said substance is unnecessarily adsorbed by the shaped article of polyoxadiazole series resin and water-washing after said treatment must be carried out for a long period of time. Furthermore, the temperature of the aqueous solution is not critical.

If necessary, the resulting polyoxadiazole series resin shaped articles coagulated in the above-described coagulating bath are drawn preferably within a range of less than 15 times their original length in the gelled state or in the swollen and undried state, whereby the shaped articles having excellent transparency and mechanical properties particularly, can be obtained. In this case, the drawing can be effected in a wet state containing either the coagulating solution or the washing water and further such drawing can be effected in a liquid, such as, coagulating bath, water, glycerine, etc., or in air.

The drawing temperature has also a wide range and as far as the shaped articles are in undried state, there is no limitation in any condition. Furthermore, the shaped articles obtained in a preferable coagulating bath can be drawn somewhat even in a dried state. This can be seen apparently from the fact that the shaped articles under the present invention has a large value of elongation at break.

Polyoxadiazole series resin shaped articles obtained by the present process can provide excellent chemical and thermal properties by heating at a temperature, for example, 200°C or higher, preferably 200° to 600°C.

The invention will be further explained in detail by the following Examples. The part and percentage mean by weight.

EXAMPLE 1

332 parts of terephthalic acid, 273 parts of hydrazine sulfate and 5,300 parts of fuming sulfuric acid containing 30% of SO, were charged into a reaction vessel, and the resulting mixture was reacted at 90°C for 2 hours and further at 130°C for 5 hours to obtain a solution of polyoxadiazole in fuming sulfuric acid. The resulting polyoxadiazole resin had an inherent viscosity of 2.3 in 0.5% resin solution in 95% sulfuric acid at 30°C.

Then, the resulting solution was diluted with 1,300 parts of 95% sulfuric acid at 80°C to obtain 4% solution of polyoxadiazole in sulfuric acid having a concentration of 100%, and the viscosity of this diluted resin solution was 2,500 poises. The resin solution was extruded through a spinneret provided with 15 orifices, each 0.2 mm diameter, into 54% aqueous solution of sulfuric acid at 62°C and coagulated at a linear velocity of 5.5 m/min. The coagulated filament thus obtained was introduced into water bath to remove sulfuric acid for 10 minutes, into the bath of an aqueous solution of sodium hydroxide (0.5 wt. % concentration), and further into water bath to wash, and drawn to 3 times its original length and then dried. The resulting filaments had a fineness of 7.2 deniers, a tenacity of 3.6 g/denier, an elongation at break of 50% and a Young's modulus of 72 g/denier. This filament did not show any change of tenacity after heating at 350°C in air for 10 hours, and after heating at 200°C in air for 5,000 hours.

For comparison, the filament obtained by the same manner as described above, except that the treatment with the aqueous solution of sodium hydroxide was not effected, showed 12% decrease of its original tenacity after heating at 200°C in air for 5,000 hours and did not show any change of tenacity after heating at 350°C in air for 10 hours.

EXAMPLE 2

Into a reaction vessel were charged 1,040 parts of terephthalic acid, 550 parts of hydrazine sulfate and 5,080 parts of fuming sulfuric acid containing 18% of SO, and the mixture was reacted at 130°C for 6 hours while being stirred to obtain a solution of polyoxadiazole in fuming sulfuric acid. The synthesized polyoxadiazole resin had an inherent viscosity of 1.87 in 0.5% solution of 95% sulfuric acid at 30°C.

The solution of polyoxadiazole in fuming sulfuric acid thus obtained was diluted with 100 parts of 98% sulfuric acid and stirred thoroughly to make the concentration of sulfuric acid 100%, the concentration of resin 14%, and the solution viscosity 4,000 poises.

The resin solution thus obtained was subjected to a wet spinning in the same manner as described in Example 1 to produce filaments. The resulting filament had a fineness of 5.6 deniers, a tenacity of 3.2 g/denier, an elongation at break of 39% and a Young's modulus of 68 g/denier.

For comparison, the filament was produced in the same procedure as described above, except that the treatment with the aqueous solution of sodium hydroxide was not effected, but said resulting filament had substantially the same values in tenacity, elongation at break and Young's modulus, but after heating at 200°C for 4 weeks, their values decreased as shown in the following Table.

Table

|  | Tenacity | Elongation at break |
|---|---|---|
| Example | 3.2 g/denier | 39% |
| Comparison | 2.7 g/denier | 16% |

EXAMPLE 3

In 440 parts of fuming sulfuric acid containing 30% of SO$_3$, 33.2 parts of terephthalic acid and 27.3 parts of hydrazine sulfate were reacted to obtain a solution of polyoxadiazole in fuming sulfuric acid. The thus synthesized polyoxadiazole had an inherent viscosity of 2.00 in 0.5% solution of 95% sulfuric acid at 30°C.

111 parts of the resulting solution of polyoxadiazole in fuming sulfuric acid (the concentration of resin being 6%) was diluted with 120 parts of fuming sulfuric acid having 30% of SO$_3$, whereby the concentration of resin was 3% in sulfuric acid of 105% concentration and solution viscosity was 1,600 poises. Then, the resulting resin solution was charged in a spinning machine and extruded through an orifice of 0.02 mm. in diameter under a pressure of 2 atmospheric pressure into 15% aqueous solution of sulfuric acid at 20°C at a linear velocity of 16 m/min. and the spun filament in swollen state was washed with water for 5 minutes, introduced into an aqueous solution of monoethanolamine (3 weight % concentration) for 1 minute, drawn to 3 times its original length in a water bath at 20°C and washed with water and dried to obtain a filament having a high tenacity. The resulting filament had a fineness of 2.1 deniers, a tenacity of 3.7 g/denier, an elongation at break of 12% and a Young's modulus of 48 g/denier.

For comparison, the spinning was effected in the same manner as described above, except that an aqueous solution of ammonia (1 weight % concentration) was used in place of the solution of monoethanolamine.

The resulting filament had a tenacity of 3.5 g/denier, an elongation at break of 12% and a Young's modulus of 55 g/denier.

After heat at 200°C in air for 5,000 hours, the tenacities of the filaments obtained by this example and comparison were 4.1 g/denier and 2.5 g/denier, respectively.

EXAMPLE 4

The polyoxadiazole resin solution used in Example 1 was extruded through a spinneret with 30 orifices, each 0.075 mm. in diameter, into a coagulating bath at 20°C containing 45% aqueous solution of sulfuric acid, in which 12% of ammonium sulfate was dissolved, to obtain continuous filaments at a velocity of 10 m/min.

The coagulated filaments as such were able to be drawn to 5 times their original length and washed with water, immersed into an aqueous solution of aniline (1 weight % concentration) and further washed with water and then dried and heat-treated at 340°C for 5 minutes.

For comparison, the filament was produced in the same manner as described above except that the treatment with the aniline solution was not effected. The properties of two kinds of the filaments were as follows.

|  | Example | Comparison |
|---|---|---|
| Initial fineness (den.) | 2.8 | 2.8 |
| tenacity (g/den.) | 4.6 | 4.2 |
| elongation at break (%) | 20 | 18 |
| Young's modulus (g/den.) | 98 | 88 |
| After aging at 180°C for 3 months |  |  |
| fineness (den.) | 2.8 | 2.8 |
| tenacity (g/den.) | 4.6 | 4.1 |
| elongation at break (%) | 18 | 13 |
| Young's modulus (g/den.) | 102 | 92 |
| After outdoor exposure for a month |  |  |
| fineness (den.) | 2.8 | 2.8 |
| tenacity (g/den.) | 4.6 | 3.7 |
| elongation at break (%) | 14 | 8 |
| Young's modulus (g/den.) | 99 | 92 |

EXAMPLE 5

141.10 parts of terephthalic acid, 24.9 parts of isophthalic acid, 132 parts of hydrazine sulfate were added to 2,100 parts of fuming sulfuric acid containing 23% of SO$_3$ and then the resulting mixture was reacted at 130°C for 4 hours to obtain a solution of polyphenylene oxadiazole copolymer (p/m ratio:85/15) in fuming sulfuric acid.

The viscosity of the solution was 8,350 poises and the inherent viscosity of the copolymer in 100% sulfuric acid was 3.26.

The solution of the copolymer thus obtained was extruded through a slit having a width of 0.5 mm onto a moving Teflon impregnated glass cloth and coagulated by continuously passing it through a coagulating bath containing 65% aqueous solution of sulfuric acid for 20 seconds and through 30% aqueous solution of sulfuric acid for 25 seconds and then introduced into water bath. After being washed with water, the coagulated gelled film was peeled off from the glass cloth, immersed in 1% aqueous solution of monoethanolamine for 1 minute, and then thoroughly washed with water and dried and further heat-treated at 400°C for 1 minute.

The properties of the film thus obtained are shown in the following table. For comparison, the properties of the film obtained in the same manner as described above except that the treatment with the monoethanol amine solution was not effected are also shown in the table.

|  | Example | Comparison |
|---|---|---|
| Strength | 1,480 Kg/cm$^2$ | 1,460 Kg/cm$^2$ |
| Elongation | 140% | 142% |
| Electric resistance | 190 V/mm | 162 V/mm |
| tan δ | 0.002 | 0.004 |
| ε | 3.1 | 3.3 |
| After heating at 200°C for 6,000 hours |  |  |
| Strength | 1,420 Kg/cm$^2$ | 860 Kg/cm$^2$ |
| Elongation | 11.2% | 2.6% |

EXAMPLE 6

285 parts of terephthalic acid, 95 parts of isophthalic acid, 314 parts of hydrazine sulfate and 2,050 parts of fuming sulfuric acid containing 40% of SO$_3$ and 40 parts of methanol were reacted at 90°C for 2 hours while being stirred in a reaction vessel and then the temperature was raised to 130°C and the reaction was continued for about 4 hours to obtain a solution of oxadiazole-N-methylhydrazide copolymer (oxadiazole units 74 mol%, N-methylhydrazide units 26 mol%) in fuming sulfuric acid. The inherent viscosity of the resulting oxadiazole-N-methylhydrazide copolymer was 0.096 in 0.5% solution in 95% sulfuric acid at 30°C.

The solution of the copolymer in fuming sulfuric acid, thus obtained while being cooled with ice, was diluted with 40 parts of ice block and further stirred for 1 hour to make the concentration of sulfuric acid 103%, the concentration of resin 13%, and the solution viscosity 3,500 poises.

This solution was extruded through a slit having a width of 0.3 mm and a length of 100 mm into a coagulating bath containing 35% aqueous solution of sulfuric acid at 60°C and having a length of 1 m and coagulated and then washed, and passed through a bath of 1% sodium carbonate in water with five stages of guide rollers to wind up a film having a thickness of 0.025 mm. at a velocity of 3 m/min. The resulting film was immediately drawn to 1.5 times its original length in a hot water at 60°C, and then washed with water and dried. The thus produced film had a tensile strength of 1,630 Kg/cm$^2$ and an elongation at break of 18%. This film retained the original tensile strength after heat aging tests at 220°C for 240 hours and also at 180°C for 5,000 hours. But the film which was not passed through a bath of 1% sodium carbonate in water, retained only 80% of the original tensile strength after heat aging test at 180°C for 5,000 hours.

EXAMPLE 7

Into a reaction vessel were fed 249 parts of terephthalic acid, 97 parts of dimethyl isophthalate, 273 parts of hydrazine sulfate and 2,400 parts of fuming sulfuric acid containing 20% of SO, and the resulting mixture was reacted while being stirred at 130°C for 6 hours to obtain a solution of oxadiazole-N-methylhydrazide copolymer (oxadiazole units 86 mol%, N-methylhydrazide units 14 mol%) in fuming sulfuric acid. The resulting copolymer had an inherent viscosity of 0.060 in 0.5% solution in 95% sulfuric acid at 30°C. Then, the resulting solution of the copolymer in fuming sulfuric acid was diluted with 600 parts of 90% sulfuric acid and stirred thoroughly to decrease the viscosity of the solution (concentration of sulfuric acid 98%, concentration of resin 8% and solution viscosity 2,300 poises). The resin solution thus produced was extruded through a spinneret provided with 30 orifices, each 0.075 mm. in diameter, into 20% aqueous solution of sulfuric acid containing 16% of ammonium sulfate at 45°C and coagulated at a linear velocity of 21 m/min. and the coagulated filament thus obtained was treated in the same manner as described in Example 1. For comparison, the spinning was effected in the same manner as described above except that an aqueous solution of ferric hydroxide (1% by weight concentration) was used in place of the aqueous solution of sodium hydroxide.

The properties of the resulting filaments were as follows.

|  | Example | | | Comparison | | |
|---|---|---|---|---|---|---|
|  | T | E | Y | T | E | Y |
| Initial | 4.1 | 42 | 57 | 3.5 | 12 | 55 |
| After heating at 180°C for 2,000 hours | 4.8 | 29 | 82 | 2.3 | 5 | 67 |
| After outdoor exposure for 1,000 hours | 4.0 | 25 | 75 | did not measure | | |

T: tenacity g/den.,
E: elongation at break %,
Y: Young's modulus g/den.

EXAMPLE 8

The same resin solution as that used in Example 3, to which was added 4% of sodium sulfate, was poured onto a glass plate, dipped for 1 minute in a 10°C coagulating bath containing 30% aqueous solution of sulfuric acid, and washed for 30 minutes and immersed into a Menzel's buffer solution (pH 9.9) consisting of the mixture of 0.2 mole sodium carbonate and 0.2 mole sodium bicarbonate in 2 liters of water and washed again with water to obtain light yellow and translucent swollen film. Then, the resulting film in wet state was subjected to bi-axial drawing, that is, twice as large in the longitudinal direction and 1.5 times as large in the transverse direction, washed with water, and dried in the stretched state. The thus obtained film was light yellow and transparent.

For comparison, another film was obtained in the same manner as described above, except that Menzel's buffer solution treatment was omitted. The properties of the resulting films were as follows.

|  | Example | | Comparison | |
|---|---|---|---|---|
|  | TS | E | TS | E |
| Initial | 16.8 | 25 | 16.8 | 30 |
| After heating at 180°C | | | | |

|  | Example | | Comparison | |
|---|---|---|---|---|
|  | TS | E | TS | E |
| for 1 month | 16.9 | 22 | 16.8 | 19 |
| for 2 month | 16.9 | 21 | 16.7 | 14 |
| for 3 month | 16.9 | 21 | 16.6 | 12 |
| After outdoor exposure | | | | |
| for 1 month | 16.8 | 25 | 14.3 | 7 |

TS: tensile strength Kg/mm²
E: elongation at break %

EXAMPLE 9

Into a reaction vessel were charged 166 parts of terephthalic acid and 140 parts of hydrazine sulfate and 5,680 parts of fuming sulfuric acid containing 30% of $SO_3$ and then 63 parts of dimethyl sulfate were added thereto. The resulting mixture was reacted at 85°C for 1 hour and further at 130°C for 7 hours while being stirred to obtain oxadiazole-N-methylhydrazide copolymer (oxadiazole units 69 mol%, N-methylhydrazide units 31 mol%), which had an inherent viscosity of 0.067 in 0.5% solution in 95% sulfuric acid at 30°C. The resin solution (concentration of resin 3%, concentration of sulfuric acid 105%, and solution viscosity 1,900 poises) thus prepared was spun and treated in the same manner as described in Example 1, and the spun filament was drawn to 7 times its original length in air in swollen state, washed with water and dried to obtain filaments having a high tenacity. The resulting filament had a fineness of 1.9 den., a tenacity of 3.9 g/den., an elongation a break of 32% and a Young's modulus of 46 g/den. and after heating at 180°C in air for 5,000 hours, this filament retained 95% of its original tenacity.

For comparison, the filament was obtained in the same manner as described above except that an aqueous solution of calcium hydroxide (0.5% by weight concentration) was used in place of a solution of sodium hydroxide. The resulting filament had a fineness of 2.0 den., a tenacity of 3.5 g/den., an elongation at break of 32% and a Young's modulus of 66 g/den. and after heating at 180°C in air for 5,000 hours, this filament only retained 24% of its original tenacity.

And in weathering resistance, the filament in this example retained 83% of its original tenacity although the filament in comparison did not measure its tenacity after exposure in outdoor for a month.

EXAMPLE 10

4% solution of the polyoxadiazole in 100% sulfuric acid obtained in Example 1 was extruded through a spinneret with 15 orifices, each 0.2 mm. in diameter, into a coagulating bath containing 54% aqueous solution of sulfuric acid, to which were added 5% of zinc sulfate and 3% of magnesium sulfate, and coagulated at 40°C and at a linear velocity of 7 m/min. Immediately after the filaments were spun, they were drawn to 7.7 times their original length in hot water at 55°C, washed with water and immersed into a bath consisting of 3 weight % triethanolamine in water and further washed and dried. The resulting filament had a fineness of 2.9 den., a tenacity of 4.4 g/den., an elongation at break of 23% and a Young's modulus of 83 g/den. The filaments were subjected to a heat-treatment by passing through a furnace at 400°C for 30 seconds. The resulting filaments did not show any change in the tenacity even if they were heated at 350°C for 10 hours in air, and also at 250°C for 500 hours in air. But the filaments obtained in the same manner except that the treatment of triethanolamine was not effected showed 18% decrease of their initial tenacity at 250°C aging test for 500 hours.

EXAMPLE 11

To 200 parts of 4% polyoxadiazole resin solution in 100% sulfuric acid obtained in Example 1 were added 4.0 parts of ethyl alcohol. The resulting solution was reacted at 50°C for 1 hour while being stirred to obtain a solution of oxadiazole-N-ethylhydrazide copolymer constituted 60 mol% by oxadiazole units and 40 mol% by N-ethyl-hydrazide units (inherent viscosity 0.049). The viscosity of said solution was 1,600 poises. A glass cloth, which had previously been dipped into concentrated sulfuric acid to remove surface treating agent, was impregnated with the above resin solution. The impregnated glass cloth was dipped into 55% aqueous solution of sulfuric acid which contained formamide at the concentration of 5 weight % of the solution for 2 minutes, then passed through 15% aqueous solution of sulfuric acid at 60°C, washed with water, sprayed with a solution of 0.5 wt. % concentration of potassium carbonate in water and further washed and dried. The impregnated glass cloth thus obtained was further passed through an electric furnace at 250°C for 20 minutes to obtain a yellow impregnated glass cloth. This impregnated glass cloth contained 34% of resin and had a volumetric resistivity of $10^{14}$ Ωcm, a dielectric constant of 4.2, a tan δ of $40 \times 10^{-4}$ and a dielectric strength of 48.0 KV.

The dielectric strength remained unchanged, even after said impregnated glass cloth was subjected to a heat aging test at 250°C for 100 hours and at 200°C for 3,000 hours, while the impregnated glass cloth obtained by the same manner as described above except that the treatment with the aqueous solution of potassium carbonate was not effected, decreased to 43.0 KV in its dielectric strength after heating at 200°C for 3,000 hours.

EXAMPLE 12

2 parts of propylene were added to 200 parts of 4% polyoxadiazole solution in 100% sulfuric acid obtained in Example 1 under pressure and absorbed therein. The resulting mixture was reacted in the same manner as described in Example 11 to obtain a solution of N-isopropyl-hydrazide-oxadiazole copolymer (N-isopropylhydrazide units 23%, oxadiazole units 77%) (inherent viscosity 0.54) in sulfuric acid. This resin solution having a viscosity of 4,400 poises was extruded through a spinneret with 30 orifices, each 0.075 mm. in diameter, into 59% aqueous solution of sulfuric acid, to which was added 8% of magnesium sulfate, and coagulated at 60°C and at a linear velocity of 5.8 m/min. The resulting filaments in swollen state were repeatedly drawn 10 times, each time to a length 1.1 times as large as the previous length, washed with water and dried. This drawing was made 3 times in water, 2 times in a bath consisting of 1 % concentration of pyridine in water, 3 times in water and 2 times in 80°C hot water. Then the filaments were passed through a furnace at 350°C for 2 minutes to obtain yellow filaments having a fineness of 2.2 den., a tenacity of 4.2 g/den., an elongation at break of 32% and a Young's modulus of 85 g/den. Even after the filaments were dipped in 10% aqueous alkali solution or 30% aqueous strong mineral acid solution for 48 hours, the tenacity was not changed. Moreover even after the filaments were heated at 250°C for 24 hours in air, their mechanical properties were not substantially changed. While, when the above spun filaments were not heat-treated in a furnace at 350°C, they were soluble in 10% aqueous alkali solution.

For comparison, the filament obtained in the same manner as described above except that water bath was used in place of an aqueous pyridine solution bath, decreased to 12% in tenacity after heating at 200°C for 5,000 hours although the filaments in this example did not show any change in tenacity after the same heat aging.

EXAMPLE 13

The same resin solution as used in Example 1 was poured on a glass plate and dipped into 98% formic acid at 10°C to obtain a film in gelled state having a thickness of 0.200 mm. This film was washed with 20% aqueous solution of formic acid and then thoroughly washed with water, immersed into Sørensen's buffer solution (pH 6) consisting of $KH_2PO_4$ and $Na_2HPO_4$ and thoroughly washed with water again, subjected to biaxial drawing to 1.5 times its original length and dried to obtain a translucent film, which had a tensile strength of 1,680 Kg/cm², and an elongation at break of 6%. This film, after being heated at 250°C for 1,000 hours and at 180°C for 10,000 hours, had a tensile strength of 1,620 Kg/cm² and an elongation at break of 5% showing substantially no change.

For comparison, the filament obtained in the same manner as described above, except that Sørensen's buffer solution consisting of glycine, sodium chloride and sodium hydroxide (pH 12.60 at 20°C) was used in place of buffer solution used in this example, decreased in tensile strength to 92% of its original value after heating at 180°C for 10,000 hours.

EXAMPLE 14

The same resin solution as the one used in Example 1 was extruded through a spinneret with 15 orifices, each 0.200 mm. in diameter, into a coagulating bath containing 78% aqueous solution of formic acid, to which was added 7% of zinc chloride, and having a length of 500 cm to obtain filaments at 21°C at a take-up velocity of 18 m/min. The filaments were drawn to 4.3 times their original length, washed with water, immersed into a bath consisting of 5% concentration of N,N-dimethylformamide in water and thoroughly washed with water and dried to obtain yellowish white filaments. The resulting filament had a fineness of 3.4 den., a tenacity of 3.8 g/den., an elongation at break of 11% and a Young's modulus of 48 g/den.

The filaments obtained in this example and the filaments obtained in the same manner as described above except that the treatment of N,N-dimethylformamide solution was not effected for comparison, were heat-aged at 200°C for 3,000 hours. The retention of tenacity after aging was 98% of initial value in the former, 62% in the latter, respectively.

EXAMPLE 15

194 parts of isophthal dihydrazide, 205 parts of isophthaloyl acid chloride were stirred vigorously in 1,600 parts of hexamethylphosphoramide for 24 hours while the reaction temperature was kept at lower than 15°C to obtain a viscous milk-white solution, which was poured into a large amount of water, whereby resin was precipitated. The resulting resin was washed with water thoroughly and then dried at 100°C under vacuum to obtain polyhydrazide resin. This polyhydrazide resin was heated at 280°C under vacuum to effect cyclodehydration, whereby polyoxadiazole resin was obtained. This polyoxadiazole resin was dissolved in 100% sulfuric acid to obtain a solution having a polyoxadiazole resin concentration of 12% and a solution viscosity of 2,900 poises. (The resulting polyoxadiazole resin had an inherent viscosity of 0.62 in 0.5% resin solution in 95% sulfuric acid at 30°C.)

A glass cloth was impregnated with the resin solution thus obtained, then dipped for 1 minute into a 40°C coagulating bath composed of an aqueous solution containing 25% of sulfuric acid and 10% of formic acid, and then washed with water, treated with 2% concentration of morpholine in water, washed again with water and dried.

The yellowish white impregnated glass cloth contained 39% of resin and had a dielectric strength of 48 KV, a volumetric resistivity of $10^{15}$ Ωcm, a dielectric constant of 4.2 and a tan δ of 0.32%.

For comparison, the impregnated glass cloth obtained in the same manner as described above except that the treatment with morpholine solution was not effected, had a dielectric strength of 45 KV, a volumetric resistivity of $10^{14}$ Ωcm, a dielectric constant of 4.2, and tan δ of 0.45%.

After heating at 200°C for 5,000 hours, the dielectric strength of the impregnated glass cloth obtained in this example and in comparison were 48 KV and 37 KV, respectively.

EXAMPLE 16

The same resin solution as the one used in Example 3 was extruded through a spinneret with 10 orifices, each 0.075 mm. in diameter, into 65% aqueous solution of dichloroacetic acid at 20°C at a velocity of 12 m/min. to obtain filaments. Immediately after sulfuric acid was removed with an aqueous solution of lithium hydroxide, the filaments were drawn to 2 times their original length in air at 210°C.

The filament thus obtained had a fineness of 4.5 den., a tenacity of 2.3 g/den., an elongation at break of 9% and a Young's modulus of 52 g/den. and did not change in tenacity after heating at 210°C in air for 500 hours. But the tenacity of the filament obtained in the same manner as described above except that the treatment with the aqueous solution of lithium hydroxide was not effected, decreased by 7% of its initial value after heating under the same condition as described above.

EXAMPLE 17

Wet-spinning was effected in the same manner as described in Example 16 to obtain filaments, except that chloroacetic acid was used instead of dichloroacetic acid in the coagulating bath. The resulting filament had a fineness of 4.9 den., a tenacity of 2.1 g/den., an elongation at break of 11% and a Young's modulus of 62 g/den.

EXAMPLE 18

28 parts of 2-(p-carboxyphenyl)-5(6)-carboxy benzoxazole, 149 parts of terephthalic acid and 138 parts of hydrazine sulfate were dissolved in 4,000 parts of fuming sulfuric acid containing 25% of $SO_3$ and the resulting solution was reacted in the same manner as described in Example 2 to obtain a resin solution having an inherent viscosity of 2.98 in concentrated sulfuric acid.

The resin solution was diluted with 95% sulfuric acid so as to make a concentration of sulfuric acid 100%, poured on a glass plate, dipped in 45% aqueous solution of sulfuric acid at 38°C for coagulation, washed with water, immersed into 1% aqueous solution of triethanolamine, washed again with water and dried at 100°C to obtain a film. This film had a tensile strength of 1,850 Kg/cm² and an elongation at break of 35%. After heating at 400°C for 1 minute, the film had a tensile strength of 1,970 Kg/cm² and an elongation at break of 27% and did not change in the tensile strength and retained the elongation of 18% after heating at 200°C for 1 month.

For comparison, the film obtained in the same manner as described above, except that the coagulated film was not immersed in the aqueous solution of triethanolamine but was washed with water for 24 hours and dried at 100°C, did not show any change in its initial value as in the above case, but showed somewhat deteriorated mechanical properties after heating at 200°C for 1 month, i.e., the tensile strength was 1,840 Kg/cm² and the elongation was 12%.

EXAMPLE 19

A copolymer of benzimidazole and 1,3,4-oxadiazole obtained by reacting 2,2'-di(4-carboxyphenyl)-5,5'-bibenzimidazole with hydrazine sulfate in polyphosphoric acid (inherent viscosity 2.00, measured in the same manner as described in Example 1) was dissolved in 100% sulfuric acid so as to make the resin concentration 3.2%. The resin solution was extruded through a spinneret having 30 orifices of 75 μ diameter into 45% aqueous solution of sulfuric acid containing 10% of manganese sulfate and the resulting coagulated filaments were wound up at a rate of 5.8 m/min., washed with water, immersed into a buffer solution consisting of boric acid, potassium chloride and sodium hydroxide and having a pH of 9.6 (Clark-Lubs' buffer solution), washed again with water and dried to obtain filaments. The resulting filaments were heated at 390°C for 1 minute.

The properties of the filament thus obtained are shown in the following table. Moreover, for comparison, the filament was obtained in the same manner as described above except that the coagulated filament was not immersed in the Clark-Lubs' buffer solution and was washed with water for 24 hours, and the properties thereof are also shown in the table.

|  | Example | Comparison |
|---|---|---|
| Fineness (denier) | 3.9 | 3.9 |
| Strength (g/denier) | 5.4 | 5.4 |
| Elongation (%) | 18 | 15 |
| After heating at 200°C for 1 month Strength (g/denier) | 5.4 | 5.1 |
| After heating at 200°C for 1 month Elongation (%) | 17 | 11 |
| After outdoor exposure for 1 month Strength (g/denier) | 5.4 | 3.6 |
| After outdoor exposure for 1 month Elongation (%) | 14 | 4.7 |

What is claimed is:
1. A method for forming a shaped article of polyoxadiazole series resin, which comprises introducing a resin solution of 2 to 15% by weight of polyoxadiazole series resin in sulfuric acid of 78 to 110% by weight concentration through an opening of predetermined cross-section into a coagulating bath selected from the group consisting of:
 1. 15 to 68% by weight of aqueous solution of sulfuric acid;
 2. 60 to 100% by weight aqueous solution of lower aliphatic carboxylic acid having pka (25°C) of less than 3.8 and selected from the group consisting of formic acid, mono- and polyhaloacetic acids and halopropionic acid;
 3. mixed aqueous solution of sulfuric acid and at least one of the above carboxylic acids, in which the quantity of sulfuric acid is 15 to 68% by weight or in which the quantity of said carboxylic acids is more than 60% by weight;
 4. a solution of any of the above-described coagulating baths (1) to (3) mixed with less than saturated concentration of at least one inorganic salt selected from the group consisting of sulfates, phosphates, chlorides, and nitrates of ammonium, aluminum, sodium, zinc, magnesium, nickel, iron, copper, potassium, manganese, and ferro-aluminum; and
 5. mixed solution of any one of the above-described coagulating baths (1) to (4) and amide compounds selected from the group consisting of formamide, N-methyl formamide, N-ethyl formamide, N-propyl formamide, N-butyl formamide, N,N-dimethyl formamide, N,N-diethyl formamide, N,N-dipropyl formamide, N,N-dibutyl formamide, acetamide, N,N-dimethylacetamide, N,N-diethylacetamide, diacetamide, triacetamide, methylenediacetamide, propionamide, oxalic amide, N-methyl pyrrolidone or salts of these amides with mineral acids, to be coagulated, and then washing the coagulated article with water and allowing it to come into contact with an aqueous solution of at least one of the substances selected from the group consisting of:
 1. buffer solution indicating pH 5.0 to pH 12.0 selected from the group consisting of Clark-Lubs' buffer solution, Sorensen's buffer solution, Atkins-Pantin's buffer solution, Mengel's buffer solution and Gomori's buffer solution;
 2. amide compounds soluble in water selected from the group consisting of formamide, N-methyl formamide, N-ethyl formamide, N-propyl formamide and n-butyl formamide, N,N-dimethyl formamide, N,N-diethyl formamide, N,N-dipropyl formamide, N,N-dibutyl formamide, acetamide, N,N-dimethylacetamide, N,N-diethylacetamide, diacetamide, triacetamide, methylene diacetamide, propionamide, oxalic amide and N-methylpyrrolidone;
 3. amines selected from the group consisting of butylamine, propylamine, diethylamine, triethylamine, ethylenediamine, trimethylenediamine, nonamethylenediamine, piperazine, hexamethylenetetramine, ethanolamine, diethanolamine, triethanolamine, morpholine, N-methylmorpholine, p-aminophenol, aniline, ethylaniline, dimethylaniline, toludine, pyridine, o-phenylenediamine and α-naphthylamine; and
 4. hydroxides, carbonates, bicarbonates, silicates, acetates and phosphates of sodium potassium, lithium, magnesium copper, manganese and zinc, further washing with water and drying it.

2. The method as claimed in claim 1, wherein said polyoxadiazole series resin is polyoxadiazole resin consisting of the following structural unit

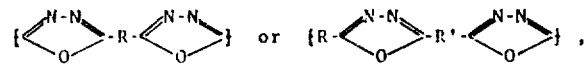

wherein R and R' are the same or different bivalent radicals selected from the group consisting of aromatic ring with or without heterocycles and, if necessary, $-CH_2-$, $-O-$, $-S-$, $-CO-$, $-SO_2-$, the molecular weight of said resin corresponding to an inherent viscosity of more than 0.4 in 0.5% by weight resin solution in 95% by weight sulfuric acid at 30°C.

3. The method as claimed in claim 2, wherein said polyoxadiazole resin is poly(phenylene-1,3,4-oxadiazole) consisting of the following structural unit

wherein

is p- or m-phenylene radical.

4. The method as claimed in claim 1, wherein said polyoxadiazole series resin is oxadiazole-N-substituted hydrazide copolymeric resin consisting of the following structural units

wherein R is bivalent radical selected from the group consisting of aromatic ring with or without heterocycles and, if necessary, $-CH_2-$, $-O-$, $-S-$, $-Co-$, $-SO_2-$, and R'' is alkyl, cycloalkyl, or aralkyl group having 1 to 7 carbon atoms, the molecular weight of said resin corresponding to an inherent viscosity of more than 0.04 in 0.5% by weight resin solution in 95% by weight sulfuric acid at 30°C.

5. The method as claimed in claim 4, wherein said oxadiazole-N-substituted hydrazide copolymeric resin consists of the following structuural units

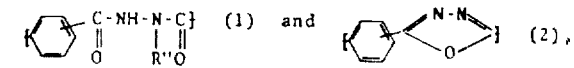

wherein

is p- or m-phenylene radical and R'' is methyl, ethyl, isopropyl or tertiary butyl group, the structural unit having the above formula (1) constituting 5 to 50 mol% and the structural unit having the above formula (2) constituting 95 to 50 mol% of the copolymer.

6. The method as claimed in claim 1, which comprises impregnating a porous substrate with said resin solution and dipping the impregnated substrate into the coagulating bath.

7. The method as claimed in claim 1, wherein the aqueous solution of sulfuric acid to be used in said coagulating bath is 35 to 60% by weight aqueous solution of sulfuric acid.

8. The method as claimed in claim 1, wherein the inorganic salts to be used in said coagulating bath are inorganic sulfates.

9. The method as claimed in claim 8, wherein said sulfates are sulfates of sodium, magnesium, zinc and ammonium.

10. The method as claimed in claim 1, wherein said amide compounds to be used in said coagulating bath are formamide, N,N-dimethyl or diethyl formamide, acetamide, N,N-dimethyl or diethyl acetamide, N-methylpyrrolidone.

11. The method as claimed in claim 1, wherein said amide compounds to be used in said solution for contact with the coagulated article after washing are formamide, N,N-dimethyl or diethyl formamide, acetamide, N,N-dimethyl or diethyl acetamide or N-methyl pyrrolidone.

12. The method as claimed in claim 1, wherein said amines to be used in said solution for contact with the coagulated article after washing are monoethanolamine, diethanol amine, triethanolamine, aniline, triethylamine, pyridine or p-aminophenol.

13. The method as claimed in claim 1, wherein said aqueous solution to be used for contact with the coagulated article after washing is aqueous solution of sodium hydroxide, lithium hydroxide, sodium carbonate, potassium carbonate, sodium bicarbonate or sodium silicate.

14. The method as claimed in claim 1, further comprising drawing the coagulated shaped articles produced by the method defined in claim 1, in undried state before drying.

15. The method as claimed in claim 14, wherein a rate of said drawing is less than 15 times the original length of the shaped articles.

16. The method as claimed in claim 1, further comprising heating the resulting shaped articles produced by the method defined in claim 1, at a temperature of 200° to 200°C.

17. The method as claimed in claim 1, further comprising drawing the coagulated shaped articles produced by the method defined in claim 1, in undried state before drying, then heating the resulting shaped articles at a temperature of 200° to 600°C.

* * * * *